United States Patent [19]

Miyakawa et al.

[11] Patent Number: 4,868,972
[45] Date of Patent: Sep. 26, 1989

[54] METHOD FOR MANUFACTURING A MAGNETIC HEAD FOR PERFORMING HIGH DENSITY RECORDING AND REPRODUCING

[75] Inventors: Hideaki Miyakawa; Makoto Kameyama, both of Yokohama, Japan

[73] Assignee: Canon Kabushiki Kaisha, Tokyo, Japan

[21] Appl. No.: 127,590

[22] Filed: Dec. 3, 1987

Related U.S. Application Data

[60] Division of Ser. No. 20,174, Feb. 27, 1987, abandoned, which is a continuation of Ser. No. 605,669, Apr. 30, 1984, abandoned.

[30] Foreign Application Priority Data

May 2, 1983 [JP] Japan ................................. 58-76123

[51] Int. Cl.$^4$ ............................................... G11B 5/42
[52] U.S. Cl. ..................................... 29/603; 360/121; 360/125
[58] Field of Search ........... 29/603; 360/121, 125–127

[56] References Cited

U.S. PATENT DOCUMENTS

| 3,593,414 | 7/1971 | Beun | 29/603 |
| 3,629,519 | 12/1971 | Hanak | 360/120 |
| 3,839,784 | 10/1974 | Pierce | 29/603 |
| 4,017,899 | 4/1977 | Bagby | 360/122 |
| 4,475,137 | 10/1984 | Vasuda et al. | 360/126 |
| 4,670,972 | 6/1987 | Sakakima | 29/603 |

FOREIGN PATENT DOCUMENTS

| 0068995 | 1/1983 | European Pat. Off. | 360/119 |
| 0041517 | 4/1981 | Japan | 360/120 |
| 0032218 | 2/1983 | Japan | 360/126 |

*Primary Examiner*—Carl E. Hall
*Attorney, Agent, or Firm*—Fitzpatrick, Cella, Harper & Scinto

[57] ABSTRACT

A magnetic head including first and second magnetic core assemblies is provided, wherein the first assembly has a first portion forming a magnetic gap, a pair of second portions of magnetic material arranged on both sides of the first portion, and a pair of third portions of non-magnetic material arranged at a position adapted to sandwich the pair of second portions. The second magnetic core assembly includes a fourth portion of magnetic material which forms a magnetic circuit together with the pair of second portions. The head also has a groove facing at least one of first and second magnetic core assemblies for receiving a winding.

21 Claims, 5 Drawing Sheets

METHOD FOR MANUFACTURING A MAGNETIC HEAD FOR PERFORMING HIGH DENSITY RECORDING AND REPRODUCING

This application is a division of application Ser. No. 020,174 filed 02/27/87, now abandoned, which in turn was a continuation of application Ser. No. 605,669, filed Apr. 30, 1984, also abandoned.

BACKGROUND OF THE INVENTION

1. Field of the Invention

The present invention relates, to a magnetic head and a method of manufacturing, the same and, more particularly, to a magnetic head having a magnetic core with small track width and gap distance which can perform the high density recording and reproduction and to a method of manufacturing the same.

2. Description of the Prior Art

Figure 1A:
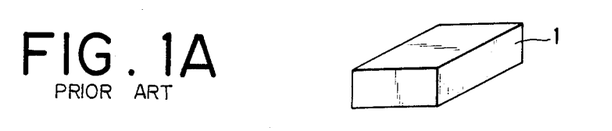
FIGS. 1A to 1E are perspective views to describe a process of manufacturing a conventional magnetic head, respectively.
Figure 1B:
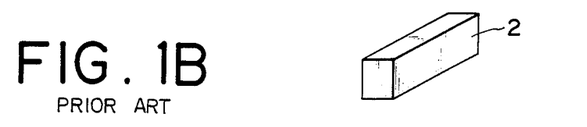
Figure 1C:
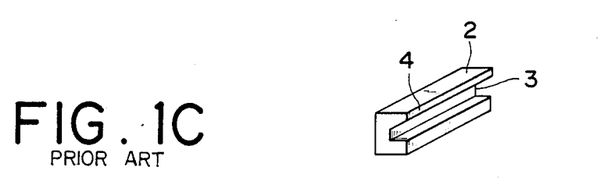

A process for manufacturing a magnetic core of this kind according to a so-called conventional confronting method will be first described with reference to FIGS. 1A to 1E. In the first step, an ingot 1 consisting of magnetic material such as ferrite or the like as shown in FIG. 1A is cut and ground, thereby to obtain a block 2 as shown in FIG. 1B. Furthermore, a winding window 3 like a long groove as shown in FIG. 1C is formed in this block 2, then it is ground to obtain a gap surface 4 serving as a confronting surface at which a magnetic gap will be formed later and is smoothly finished.

Figure 1D:
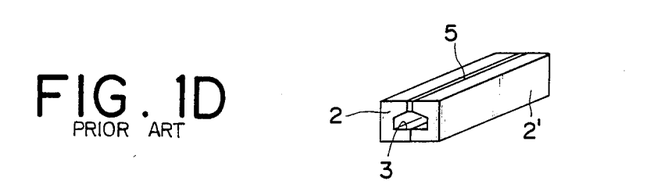

Then, as shown in FIG. 1D, such two blocks 2 and 2' which were subjected to the above-described processings are confronted so that a gap spacer 5 consisting of non-magnetic material such as $SiO_2$ or the like is sandwiched by their gap surfaces 4, and thereafter they are joined using an adhesive agent, glass, or the like.

Figure 1E:
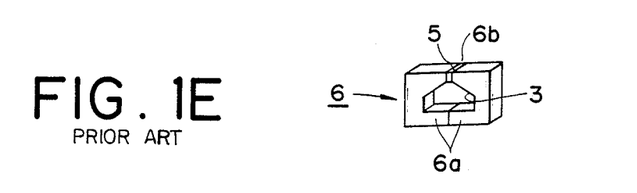

Subsequently, the blocks 2 and 2' are cut at regular intervals along the direction perpendicular to their axial directions, then each sliced assembly is further subjected to the finishing abrasion processing, so that a magnetic core unit 6 as shown in FIG. 1E is completed. In this case, a magnetic gap 6b is formed by the portion where the gap spacer 5 was sandwiched between the respective gap surfaces 4 of half-unit cores 6a and 6a which are half bodies of the magnetic core unit.

However, according to the foregoing confronting method, the gap surface 4 of the half-unit core 6a is formed due to the mechanical processing such as the grinding, cutting, abrasion, etc., so that this causes a deformation due to the processing or a notch at the corner. Due to this, it is difficult to process the device in highly accurate manner so that a width of the gap surface 4, i.e., a magnetic gap width, becomes small. Moreover, it is difficult to present the flatness of the gap surface 4 with, high degree of accuracy. In addition, since an adhesive agent is interposed for joining, a distance between the mutual gap surfaces 4, i.e., a distance of the magnetic gap will have increased.

Due to the above reasons, according to the foregoing structure and manufacturing method, it was difficult to mass-produce magnetic cores in which a magnetic gap width, i.e., a track width, is 30 μm or less and a distance of the magnetic gap is about 0.3–1.0 μm.

There will be now described another conventional process for manufacturing a magnetic head which has been proposed to solve such problems with respect to FIGS. 2A to 2I.

Figures 2A, 2B, 2C, 2F, 2G:
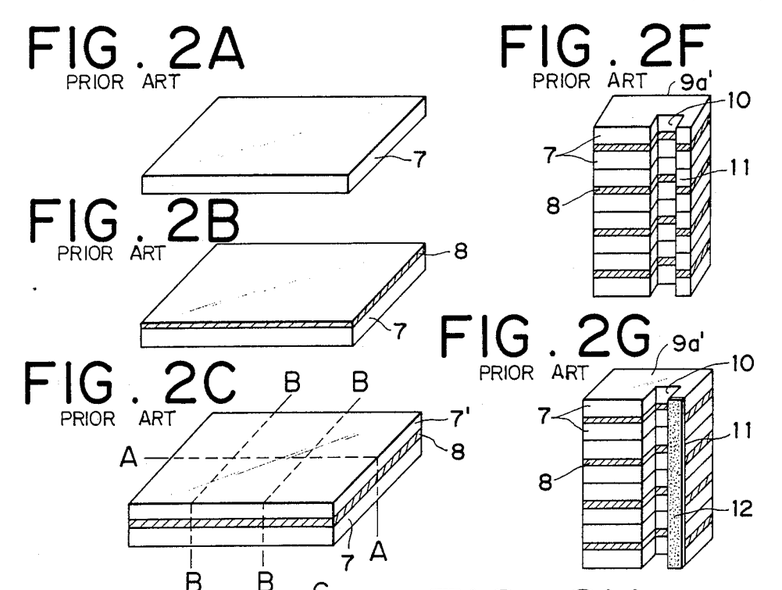
FIGS. 2A to 2I are perspective views to describe a process of manufacturing another conventional magnetic head, respectively.

A thin film of soft magnetic material such as Sendust, amorphous, or the like is formed as shown in FIG. 2B on the surface of a substrate 7 consisting of non-magnetic material such as crystallized glass or the like as shown in FIG. 2A by means of sputtering or the like, thereby to obtain a magnetic material layer 8.

Then, after another substrate 7' consisting of non-magnetic material which is not covered by the magnetic material layer 8 was overlapped on the layer 8, they are adhered by crystallized glass or adhesive agent or the like. Subsequently, it is cut along the lines A—A and B—B shown in FIG. 2C to obtain rectangular parallelopiped blocks.

Figure 2D:
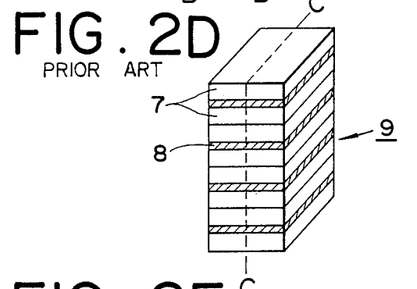

Next, these blocks are piled as shown in FIG. 2D and are mutually joined by an adhesive agent to form a lamination body 9. This lamination body 9 is further cut along the line C—C to obtain two lamination blocks 9a shown in FIG. 2E.

Then, a long groove like winding window 10 is formed in one lamination block 9a' between such two blocks by grinding or the like as shown in FIG. 2F. Furthermore, a gap surface 11 serving as a confronting surface to form a magnetic gap and H) the confronting surface are ground and are smoothly finished.

Next, as shown in FIG. 2G, a thin layer 12 of non-magnetic material such as silica $SiO_2$ or the like is formed on the gap surface 11 by way of sputtering or the like.

Figure 2E:
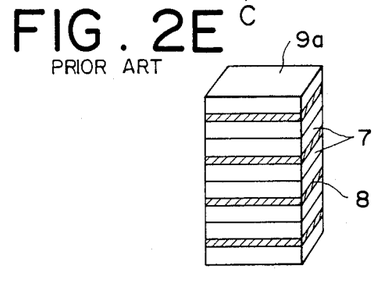
Figure 2H:
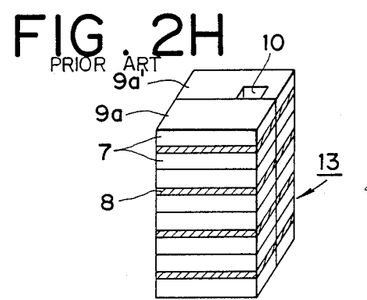

On the other hand, the confronting surface of the lamination block 9a of FIG. 2E is ground and finished. This confronting surface thus finished and the gap surface 11 onto which the non-magnetic material layer 12 was formed and the confronting surface of the lamination block 9a' are aligned in position and are confronted so that their corresponding magnetic material layers 8 face and coincide with one another. Then, they are adhered by an adhesive agent or the like to obtain a core lamination block 13 shown in FIG. 2H.

Figure 2I:
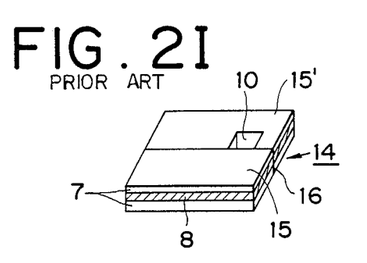

Such core lamination blocks 13 are laminated and at the portion of the substrate 7, they are cut in the direction parallel to the laminating direction so that each piece has a predetermined thickness. Thereafter, such a piece is ground and finished, so that a magnetic core unit 14 shown in FIG. 2I is completed. In this case, a magnetic gap 16 is formed through the thin non-magnetic material layer 12 between the confronting edge surfaces at the gap surfaces of the respective magnetic material layers 8 and 8 of half-unit cores 15 and 15' which are the half units of the magnetic core 14.

According to the above-described manufacturing method and structure, a thickness of the magnetic material layer 8 becomes a track width and a thickness of the thin non-magnetic material layer 12 becomes a distance of the magnetic gap; therefore, it is possible to produce a track width and a magnetic gap distance becomes small.

However, since the gap surface 11 is formed by being cut and the confronting surface and gap surface are joined by an adhesive agent or because of other similar reasons, there occur problems such as a deformation due to the processing, a diffusion of the adhesive agent, and the like similarly as in the case mentioned before, so that this causes the distance of the magnetic gap to be increased.

In addition, in this method, when the lamination blocks 9a and 9a' are confronted and joined, they have to be aligned in position so that the edge surfaces of the magnetic material layers 8 and 8 can accurately coincide and face. However, since a thickness of the magnetic material layer 8 is about 30 μm, this positioning is very difficult and the dislocation, i.e., so-called track shift will be easily caused.

That is, it was difficult to mass-produce magnetic cores having a very small track width and gap distance with a high degree of accuracy even by the foregoing structure and method.

A structure and method for manufacturing a magnetic core to solve such problems have been proposed in Japanese Patent Application Laid-Open Publication No. 73913/80.

Figures 3, 4A, 4B, 4C, 4E:
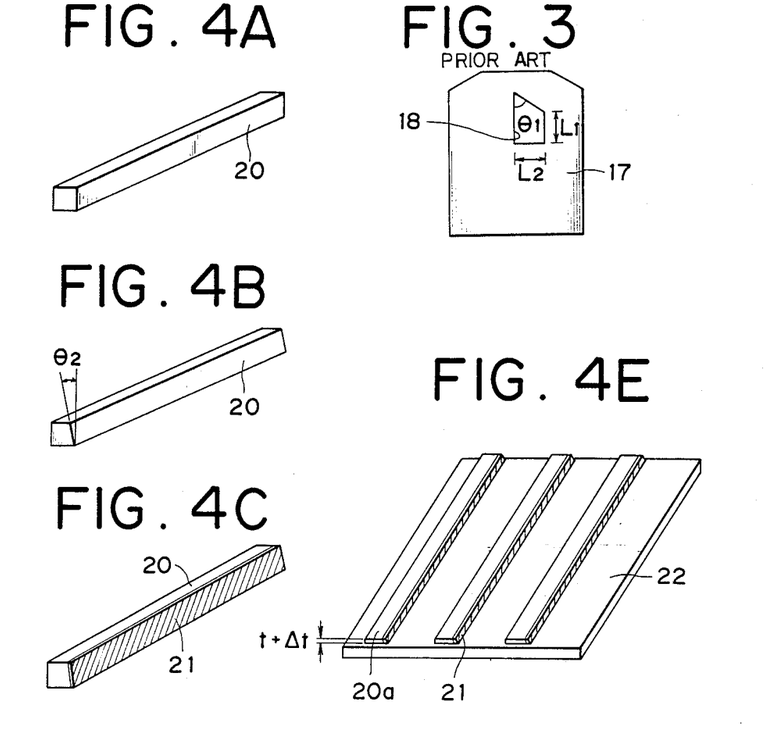
FIG. 3 is an explanatory diagram showing a structure of still another conventional magnetic head.
FIGS. 4A to 4L are perspective views to describe a process of manufacturing a magnetic head as one embodiment of the present invention, respectively.

According to this proposition, a winding window 18 serving as a throughhole is formed in a core-shaped substrate 17 consisting of non-magnetic material such as glass or the like as shown in FIG. 3. Furthermore, a thin film of soft magnetic material such as Sendust or the like is formed by means of sputtering or the like on, for example, the left half region of the side surface shown to obtain a magnetic layer, and thereafter a thin film of non-magnetic material is formed on a magnetic gap forming portion above the winding window 18 of the side surface of that magnetic layer. Subsequently, a thin film of soft magnetic material such as Sendust or the like is coated entirely on the same side surface and the same whole side surface is ground, thereby to obtain a magnetic core.

With such a structure, a thickness of the thin film of soft magnetic material becomes a gap while a thickness of the thin film of non-width magnetic material becomes a magnetic gap distance. In addition, both said thin films and the magnetic gap are formed not by mechanical processing but by sputtering or the like. Thus, a width and a distance of the magnetic gap can be accurately processed to be small.

However, in this structure, in the case where a magnetic gap width is so narrow to be, e.g., 20 μm or less, the recording and reproducing characteristics of the magnetic core are largely influenced due to a shape and a dimension of the winding window 18; therefore, the winding window 18 needs to be formed with a high degree of accuracy.

As an example, the winding window 18 has to be formed so that $\theta_1 = 60°$, $L_1 = 0.4$ mm, and $L_2 = 0.35$ mm in FIG. 3.

On the, other hand, the non-magnetic substrate 17 needs to be made of such material that its coefficient of thermal expansion is identical to that of the thin film layer of high permeability material to be formed on the substrate 17 and so that it can easily slide and follow on a recording medium such as a magnetic tape or the like and that it further has an excellent abrasion resistance. Although there is a partially crystallized glass or the like as such material, it is very difficult to form very accurately the winding window serving as the through hole in the substrate 17 consisting of such material and therefore it is impossible to realize a low cost.

On one hand, in the magnetic core of the magnetic head for recording and reproducing at high density, the necessary characteristics differ in dependence upon its portion and there is no magnetic material which can satisfy all of the characteristics. Therefore, it has been confirmed that better characteristics can be derived as a whole if the magnetic core is constituted by combining different magnetic materials in accordance with the necessity of the characteristic which differs depending upon the portion. For instance, for the portion of the magnetic core to come into contact with the slide surface of the recording medium, it is suitable to use magnetic material such as Sendust alloy, amorphous material, or the like which has a high saturation magnetic flux density, low coercive force and excellent abrasion resistance. In addition, for the other portions of the magnetic core, it is proper to use magnetic material such as ferrite or the like which has a large electrical resistance and excellent high frequency response. The combination of both of them can present overall better characteristics.

However, according to the proposed structure mentioned above, since the magnetic material portion which forms the whole magnetic path is formed by one kind of continuous magnetic material layer, the high characteristics cannot be derived due to the foregoing reasons.

SUMMARY OF THE INVENTION

It is an object of the present invention to provide a magnetic head which can eliminate such drawbacks regarding the conventional magnetic head as mentioned before.

Another object of the invention is to provide a magnetic, head having a structure which can easily raise the accuracy of each part in a high density magnetic recording and reproducing head.

Still another object of the invention is to provide a high density magnetic recording and reproducing magnetic head having ideal magnetic characteristics which can be easily manufactured.

Under such objects, a preferred embodiment of the present invention is set forth in the claims.

A further object of the invention is to provide a method for manufacturing a magnetic head which can mass-produce, at low cost, magnetic heads which can accomplish each object as mentioned above.

Other objects and features of the present invention will be more apparent from the following detailed description of the embodiments of the invention with reference to the accompanying drawings.

DETAILED DESCRIPTION OF PREFERRED EMBODIMENTS

The present invention will be described in detail hereinbelow with respect to an embodiment illustrated in the diagrams.

FIGS. 4A to 4L show one embodiment of a process of manufacturing a magnetic head according to the present invention. In FIG. 4A, shown at a reference numeral 20 is a magnetic material member having a substantially square cross section which is formed like a square pillar by soft magnetic material such as Sendust alloy, amorphous material, or the like which has a high saturation magnetic flux density and low coercive force. One side surface of this magnetic material member 20 is subjected to the processings of grinding, etching, abrasion, etc., thereby forming a slant to obtain an azimuth angle indicated by a sign $\theta_2$ in FIG. 4B.

Then, as shown in FIG. 4C, non-magnetic material such as, e.g., silica $SiO_2$ or the like is thinly adhered on the side surface with the azimuth angle $\theta_2$ of the magnetic material member 20 by way of a sputtering method or the like, thereby forming a non-magnetic material layer 21 having a thickness of about 0.1–0.5 μm.

Figure 4D:
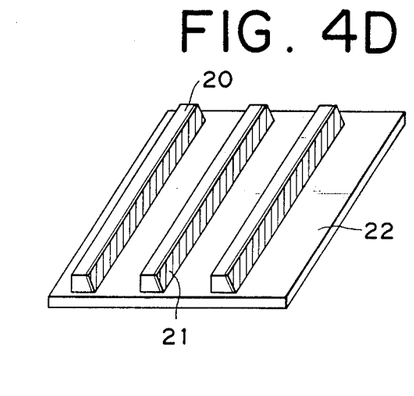

Next, a plurality of such magnetic material members 20 which were processed in the manner as described above are aligned and arranged on a substrate 22 consisting of non-magnetic material such as crystallized glass or the like at regular intervals in the same direction as shown in FIG. 4D, and they are adhered by an adhesive agent such as glass having a low melting point or the like. In this case, it is preferable to use a low-melting point glass which has a relatively high melting point.

Subsequently, as shown in FIG. 4E, the upper surface of each magnetic material member 20 is ground so as to obtain a magnetic material layer 20a having a predetermined thickness of $(t+\Delta t)$, in which t is a track width of the order of about 5–60 μm and $\Delta t$ is an abrasion clearance in the subsequent process of forming a track width.

Figure 4F:
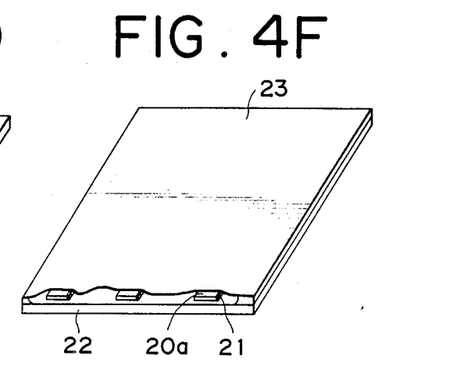

Then, as shown in FIG. 4F, the same soft magnetic material as the magnetic material layer 20a attached on the whole upper surface of the substrate 22 and on the upper surface of the magnetic material layer 20a using a thin film forming method such as sputtering or the like, thereby forming a magnetic material film 23. A thickness of the magnetic material film 23 in this case is set to be larger than at least the above-mentioned thickness of $(t+\Delta t)$. Namely, the magnetic material film 23 is formed so that the whole upper surface of the magnetic material layer 20a is completely covered.

Figures 4G, 4H, 4I, 4J, 4K, 4L:
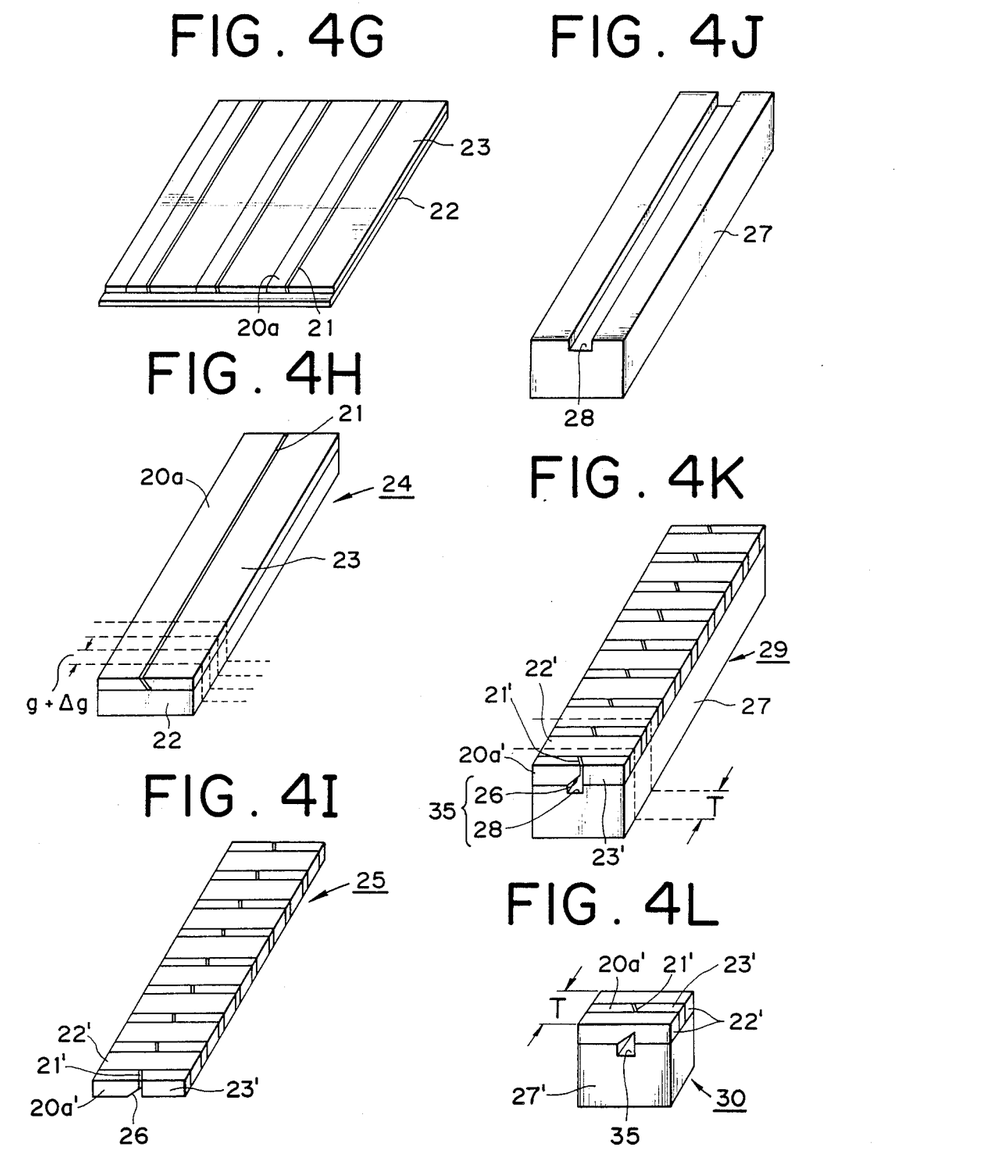

Next, as shown in FIG. 4G, the magnetic material film 23 on the substrate 22 is ground until its thickness becomes the thickness corresponding to the track width t. In this case, although the upper surface of the magnetic material layer 20a will have been exposed due to the abrasion, this layer 20a is also ground until it is the thickness of the track width t.

After the foregoing abrasion, the assembly shown in FIG. 4G is cut at regular intervals along the lines parallel to the line of the non-magnetic material layer 21, thereby obtaining a block as indicated by a numeral 24 in FIG. 4H. Thereafter, the block 24 is cut in the direction perpendicular to its axial direction, i.e., along the broken lines indicated in FIG. 4H. In this case, the block 24 is cut at regular intervals of $(\Delta g+g)$, in which $\Delta g$ denotes a magnetic gap depth and is about 30 to 40 μm while g corresponds to the measure for a frame of the winding window and is a few millimeters.

The respective segments thus formed by this cutting are arranged and laminated in a line so that a non-magnetic substrate portion 22' which is a segment of the non-magnetic substrate 22 and magnetic film portions 20a' and 23' which are respectively segments of the magnetic material layers 20a and 23 are alternately disposed as shown in FIG. 4I, thereafter they are adhered mutually and a block 25 is formed. In this adhesion, there is used low-melting point glass whose melting point is lower by 100° C. or more than that of the low-melting point glass which was used for adhesion between the magnetic material member 20 and non-magnetic substrate 22 in the step of FIG. 4D.

After this adhesion, a long groove 26 having a triangular cross section is formed in substantially the central portion of the bottom surface of the block 25 along the line which is parallel to its axial direction by way of grinding or the like.

On the other hand, a reference numeral 27 in FIG. 4J denotes a rectangular parallelopiped block consisting of soft magnetic material such as Mn - Zn ferrite or the like which has the characteristics of high magnetic permeability and high electrical resistance. A width dimension of the upper surface of this block 27 is almost equal to a width dimension of the block of FIG. 4I. A long groove 28 having a ⊔-shaped cross section is formed in substantially the central portion of the top surface of this block 27 along the longitudinal line which is parallel to its axial direction by way of grinding or the like.

The block 25 of FIG. 4I is disposed on the block 27 which was worked in this way so that the bottom surface of the block 25 is overlapped on the top surface of the block 27, then they are adhered using low-melting point glass or an organic adhesive agent or the like as shown in FIG. 4K, thereby obtaining a core block 29 whose entire perspective view is illustrated in this diagram. In this core block 29, the respective long grooves 26 and 28 of the blocks 25 and 27 are overlapped, so that a winding window 35 to wind a coil for the electromagnetic conversion later is defined.

Furthermore, this core block 29 is cut at regular intervals T along almost the center of the substrate portion 22' in the direction perpendicular to the axial direction of the core block 29, i.e., along the broken lines indicated in FIG. 4K, thereby obtaining a magnetic core unit shown at a numeral 30 in FIG. 4L. The head portion surface on the segment side of the block 25 of this magnetic core unit 30, namely, the sliding surface with the magnetic recording medium, or the like is finished by way of the abrasion processing, thereby completing the magnetic core unit 30.

In the structure of the core unit derived in this way, a pair of magnetic film portions 20a' and 23' are sandwiched from both sides by the substrate portions 22' of non-magnetic material and their edge surfaces are mutually confronted through a thin non-magnetic material layer portion 21', and these magnetic film portions 20a' and 23' constitute the magnetic circuit section which faces the sliding surface of the magnetic recording medium. In addition, the non-magnetic material layer portion 21' becomes the magnetic gap. On one hand, a block portion 27' which is a segment of the block 27 formed of magnetic material which is different from the magnetic films 20a' and 23' constitutes the magnetic circuit section at the rear portion. Furthermore, the long grooves 26 and 28 formed at the mutual junction surfaces of both magnetic circuit sections define the winding window 35.

In the above-described embodiment, although the thin film of the magnetic material layer 23 has been formed by way of sputtering, its forming method is not limited to this. An embodiment for forming a thin film corresponding to the magnetic material layer 23 by way of an electroplating method will be described herein below with respect to the foregoing FIGS. 4A to 4C and FIGS. 5A to 5E.

First of all, substantially in the same manner as in the embodiment mentioned above, as shown in FIGS. 4A–4C, the magnetic material member 20 is formed and the slant at azimuth angle of $\theta_2$ is formed on one side surface, thereafter the non-magnetic material layer 21 is formed on its slant surface.

Figure 5A:
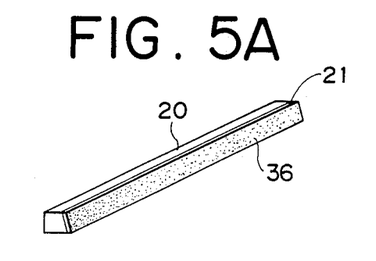
FIGS. 5A to 5E are perspective views to describe a part of a process of manufacturing a magnetic head as another embodiment of the invention, respectively.

Then, conductive material such as copper or the like having a thickness of about 500Å is adhered on the surface of the non-magnetic material layer 21 of the magnetic material member 20 by way of sputtering or the like, thereby forming a thin conductive material film 36 as shown in FIG. 5A and covering the non-magnetic material layer 21.

Figures 5B, 5D:
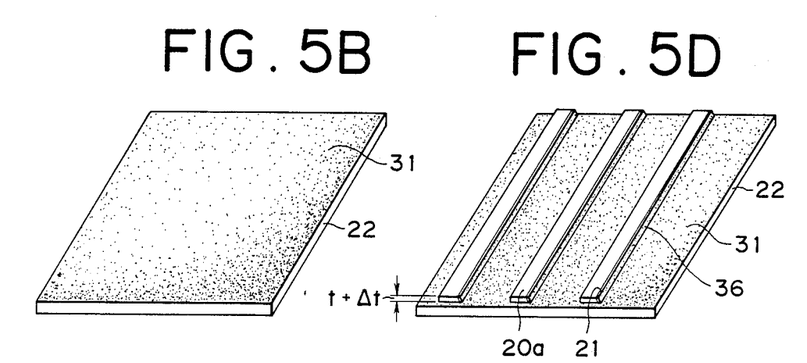

Subsequently, as shown in FIG. 5B, conductive material such as copper or the like having a thickness of about 500Å is also adhered on the upper surface of the same substrate 22 of non-magnetic material as mentioned before by way of sputtering or the like in the similar manner, thereby forming a thin conductive material film 31.

Figure 5C:
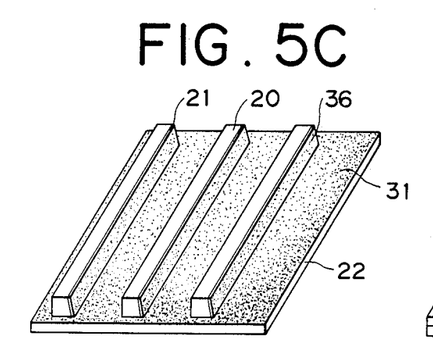
Figure 5E:
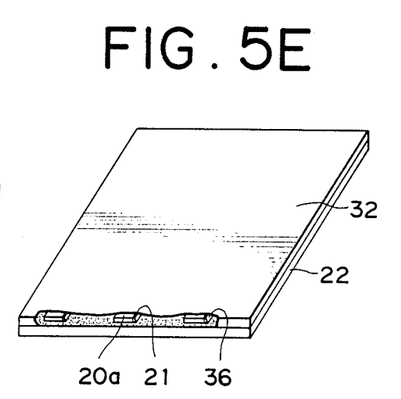

Furthermore, as shown in FIG. 5C, the bottom surface of the magnetic material member 20 of FIG. 5A is adhered on the thin conductive material film 31 which was formed on the substrate 22 using low-melting point glass or the like.

Next, as shown in FIG. 5D, the top surface of the magnetic material member 20 is ground until it becomes the thin film 20a having a predetermined thickness of $(t + \Delta t)$ substantially in the same manner as the step of FIG. 4E mentioned before.

After that, the same magnetic material as the magnetic material layer 20a having a thickness larger than the foregoing thickness of $(t + \Delta t)$ is adhered by way of the electroplating method on the thin conductive material film 31 of the substrate 22 and on the thin conductive material film 36 on the top and side surfaces of the magnetic material layer 20a, thereby forming a similar magnetic material film 32 as the magnetic film 23 in the foregoing embodiment.

Subsequently, a similar magnetic, core unit is produced through substantially the same steps as those in FIGS. 4G to 4E mentioned before.

Since the magnetic material is adhered onto the portions like a staircase, i.e., onto the side surfaces of the magnetic material layer 20a by way of sputtering in the former embodiment, there is a slight difficulty with respect to its adhesion state. However, in the case of this embodiment, no problem will be caused regarding the adhesion state since the adhesion is performed by way of the electroplating method.

In the above two embodiments, after adhering the magnetic member with the azimuth angle which was covered by the non-magnetic material layer onto the substrate 22, it is ground and the magnetic material layer 20a is formed; however, there is also a method whereby after adhering similar magnetic material onto the substrate 22 by way of sputtering or the like, an azimuth angle is formed on its side surface by way of etching or the like and furthermore a non-magnetic layer is adhered on the same side surface by way of the sputtering, thereby forming the magnetic material layer 20a.

Moreover,, in the above embodiments, the long grooves 26 and 28 have been formed in both blocks 25 and 27 to form the winding window 35; however, the winding window can be formed by forming the long groove in only either one of them.

According to the manufacturing methods of the foregoing embodiments, the magnetic gap portion which is constituted by the magnetic material layer portions 20a' and 23' and non-magnetic material portion 21 is formed by way of the sputtering or electroplating method and the abrasion; therefore, the confronting, adhesion, working, and the like of the magnetic gap surface are not performed and no deformation will be caused due to the works. Consequently, the magnetic gap with a micro width and length can be easily worked with a high degree of accuracy without causing any track shift. In addition, the winding window can be easily formed by forming the grooves instead of forming a throughhole.

In addition, according to the structures of the embodiments, since the magnetic material layer portions 20a' and 23' which are the magnetic circuit section that will face the sliding surface of the magnetic recording medium are formed of Sendust alloy or amorphous material having a high saturation magnetic flux density and abrasion resistance, they enable the recording even on a recording medium having a high coercive force such as an alloy tape which has a coercive force Hc of 1200 Oe or more; moreover, they have high abrasion resistance.

On one hand, since the magnetic material such as Mn - Zn or the like having excellent high frequency response is used for the block portion 27' which is the other back magnetic circuit section except the above section, good frequency response is presented. Due to this, there is an advantage such that a high frequency signal can be reproduced. Namely, in such structures, it is possible to selectively use magnetic material as the material for the magnetic core in accordance with the characteristic necessary for each portion of the magnetic core, so that excellent characteristics are obtained as a whole.

Furthermore, as a high density magnetic recording head in particular, it is possible to enlarge a magnetic flux transmission cross sectional area of the back magnetic circuit section without increasing a dimension of the whole magnetic head; consequently, it is possible to obtain a magnetic head having excellent characteristics with less magnetic resistance on the whole.

According to the present invention, it will be obvious from the above description that the magnetic gap portion is formed by way of the sputtering, electroplating method, or the like instead of the mechanical processing, so that it is possible to form highly accurately the magnetic gap with a micro width and length of the magnetic core of the magnetic head of the high density recording and reproducing type. In addition, since the manufacturing methods of the invention do not include a difficult step, the magnetic cores can be mass-produced cheaply. Furthermore, since the invention has such structures that different magnetic materials are combined in accordance with the characteristics necessary for each portion of the magnetic core, excellent characteristics are obtained as the characteristics of the whole magnetic core.

What is claimed is:

1. A method of manufacturing a magnetic head, comprising the steps of:
   (a) obtaining a first intermediate formation part by arranging a magnetic circuit layer on a substrate consisting of non-magnetic material, said magnetic material circuit layer being constituted in the manner such that a pair of magnetic portions consisting of magnetic material are disposed on both sides of a thin band consisting of non-magnetic material to form a magnetic gap;

(b) cutting said first intermediate formation part, thereby obtaining a plurality of second intermediate formation parts in which said substrate and said magnetic circuit layer are respectively arranged;

(c) obtaining a third intermediate formation part by laminating and joining said plurality of second intermediate formation parts so that said substrate portion of said second intermediate formation part and said magnetic circuit layer portion are alternately arranged;

(d) cutting said third intermediate formation part so that said substrate portion is arranged on both sides of said magnetic circuit layer portion, thereby obtaining a plurality of fourth intermediate formation parts;

(e) obtaining a magnetic core from said fourth intermediate formation part; and (f) obtaining a magnetic head by winding a coil on said magnetic core.

2. A method according to claim 1, further comprising the step of coupling a back magnetic circuit with said magnetic circuit layer.

3. A method according to claim 2, wherein said coupling step includes a substep of laminating and joining a block consisting of magnetic material to said third intermediate formation part in the direction perpendicular to its laminating direction.

4. A method according to claim 3, wherein the block consisting of said magnetic material is also cut in said cutting step for cutting said third intermediate formation part.

5. A method according to claim 1, wherein the step of obtaining said first intermediate formation part includes a first substep of arranging one of said pair of magnetic portions onto the substrate consisting of said non-magnetic material.

6. A method according to claim 5, wherein the arrangement in said first substep is performed by way of a thin film forming method.

7. A method according to claim 6, wherein said thin film forming method is a sputtering.

8. A method according to claim 5, wherein the step of obtaining said first intermediate formation part further includes a second substep of forming the thin band consisting of said non-magnetic material on the side surface of at least one of said magnetic portions.

9. A method according to claim 8, wherein said second substep is performed by sputtering the non-magnetic material.

10. A method according to claim 9, wherein the non-magnetic material to be sputtered in said second substep is $SiO_2$.

11. A method according to claim 8, wherein the step of obtaining said first intermediate formation part further includes a third substep of adhering magnetic material onto the substrate of the non-magnetic material on which said one magnetic portion is arranged by way of a thin film forming method after the second substep.

12. A method according to claim 11, wherein the thin film forming method in said third substep is a sputtering.

13. A method according to claim 11, wherein the thin film forming method in said third substep is an electroplating method.

14. A method of manufacturing a magnetic head, comprising the steps of:
(a) obtaining a first intermediate formation part by laminating a plurality of non-magnetic layers consisting of a non-magnetic material and a plurality of magnetic circuit layers such that the non-magnetic layers and the magnetic circuit layers are alternately arranged, each of said magnetic circuit layers having first and second magnetic portions each consisting of a magnetic material, said first and second magnetic portions being disposed on different sides of a thin band consisting of a non-magnetic material to form a magnetic gap;

(b) obtaining a second intermediate formation part by laminating a third magnetic portion consisting of a magnetic material and said first intermediate formation part in the direction perpendicular to the laminating direction of said first intermediate formation part;

(c) cutting said second intermediate formation part so that first and second sides of each of said magnetic circuit layers has arranged thereon half of an adjacent non-magnetic layer, thereby obtaining a plurality of third intermediate formation parts; and (d) obtaining a magnetic head by winding a coil on said third intermediate formation part.

15. A method of manufacturing a magnetic head, comprising the steps of:
(a) forming a magnetic gap layer by depositing a non-magnetic material on a first magnetic member consisting of a first magnetic material;

(b) obtaining a first intermediate formation part by depositing a magnetic thin film formed of said first magnetic material on said magnetic gap layer;

(c) obtaining a second intermediate formation part having a non-magnetic block on each of a first and second side of the first intermediate formation part such that each non-magnetic block borders on said first magnetic member, said non-magnetic material, and said magnetic thin film;

(d) obtaining a third intermediate formation part by combining a second magnetic member consisting of a second magnetic material with said second intermediate formation part; and (e) obtaining a magnetic head by winding a coil on said third intermediate formation part.

16. A method according to claim 15, further including the step of forming a groove for receiving a winding in a surface of said second magnetic portion.

17. A method according to claim 15, further including the step of cutting said third intermediate formation part so that said first and second sides of said first intermediate formation part has arranged thereon only a portion of the corresponding non-magnetic block.

18. A method according to claim 15, wherein said first magnetic material is a magnetic alloy material.

19. A method according to claim 18, wherein said magnetic alloy material is Sendust alloy.

20. A method according to claim 15, wherein said first magnetic material is an amorphous material.

21. A method according to claim 15, wherein said second magnetic material is a ferrite material.

* * * * *

UNITED STATES PATENT AND TRADEMARK OFFICE
CERTIFICATE OF CORRECTION

PATENT NO. : 4,868,972

DATED : September 26, 1989

INVENTOR(S) : HIDEAKI MIYAKAWA ET AL.

Page 1 of 2

It is certified that error appears in the above-identified patent and that said Letters Patent is hereby corrected as shown below:

AT [56] REFERENCES CITED, TITLE PAGE:

U.S. Patent Documents, "Vasuda et al." should read --Yasuda et al.--.

COLUMN 1

Line 13, "relates," should read --relates--.
    Line 14, "manufacturing," should read --manufacturing--.
    Line 56, "with," should read --with a--.

COLUMN 2

Line 19, "groove like" should read --groove-like--.
    Line 23, "H)" should be deleted.
    Line 55, "becomes" should read --which is--.

COLUMN 3

Line 29, "gap while" should read --gap width, while--.
    Line 30, "non-width magnetic" should read --non-magnetic--.
    Line 46, "the," should read --the--.
    Line 55, "through" should read --through---.

COLUMN 4

Line 23, "netic," should read --netic--.

COLUMN 5

Line 29, "attached" should read --is attached--.

UNITED STATES PATENT AND TRADEMARK OFFICE
CERTIFICATE OF CORRECTION

PATENT NO. : 4,868,972

DATED : September 26, 1989

INVENTOR(S) : HIDEAKI MIYAKAWA ET AL.

Page 2 of 2

It is certified that error appears in the above-identified patent and that said Letters Patent is hereby corrected as shown below:

COLUMN 6

Line 63, "herein" should read --herein,--.

COLUMN 7

Line 37, "magnetic," should read --magnetic--.

COLUMN 8

Line 13, "section" should read --sections--.
Line 36, "cross sectional" should read --cross-sectional--.
Line 64, "material" should be deleted.

COLUMN 10

Line 55, "has" should read --have--.

Signed and Sealed this

Eleventh Day of June, 1991

Attest:

HARRY F. MANBECK, JR.

Attesting Officer

Commissioner of Patents and Trademarks